Aug. 10, 1948.　　　H. O. PETERSON　　　2,446,607
REMOTE CONTROL SYSTEM
Filed Jan. 22, 1943
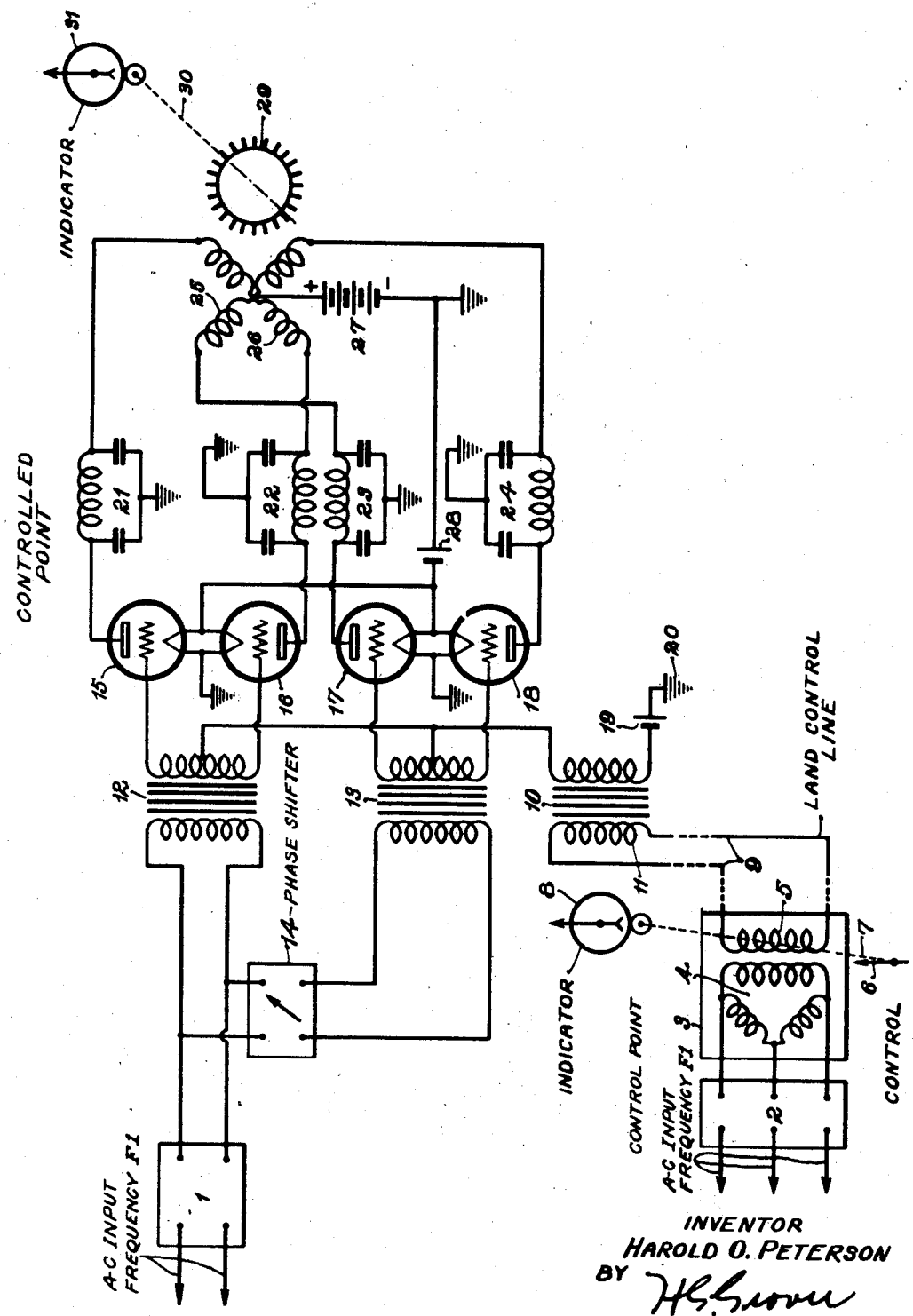
INVENTOR
HAROLD O. PETERSON
BY
ATTORNEY Patented Aug. 10, 1948

2,446,607

UNITED STATES PATENT OFFICE 2,446,607

REMOTE CONTROL SYSTEM

Harold O. Peterson, Riverhead, N. Y., assignor to Radio Corporation of America, a corporation of Delaware Application January 22, 1943, Serial No. 473,163

1 Claim. (Cl. 318—28)

1

This invention relates to a new and useful remote control or indicating system.

An object of this invention is to provide a simple means of controlling and/or indicating an operation or the position of a device remotely located over a single pair of wires where the two terminals of the circuit are operated on the same alternating current power line.

Another object of this invention is to provide a control system in which radio circuit variable elements such as rotary condensers and the like may be controlled from a distant point.

A feature of this invention is means excited by polyphase currents including rotor devices and a balanced modulator for controlling from a control point the angular position of a rotor driven element at the controlled point, with an indicator at the control point the angular motion of which is duplicated by the rotor at the controlled point.

It is often desired to control or indicate an operation of any suitable variable device at a distance over a single pair of wires, and while there are numerous methods known to the prior art, such methods often require the use of complicated movable devices and numerous circuit elements. By my device a simple, inexpensive and efficient method is devised.

This invention will best be understood by referring to the accompanying drawing which shows a circuit diagram of the remote control system of this invention. Polyphase or three-phase alternating current power from the same central network appears at the inputs 1 and 2. The inputs 1 and 2 may be located at points at a distance from each other. The source of A.-C. power input 1 is indicated as a single phase source and may be one phase of the three phase input supplied at the unit 2. If a three-phase power source is not available, it may be developed locally from single phase current and supplied at the unit 2 by any suitable phase splitting means. The three-phase power input at 2 is connected to a device 3 including three-phase stator or fixed delta coil windings 4 and a rotor coil winding 5. A manual control 6 is coupled to a shaft 7 which rotates rotor coil winding 5 and also an indicator 8. Note that the gearing between control 6 and indicator 8 may be such that control 6 rotates a number of times for each rotation of 8. The output leads from the rotor winding 5 of device 3 connect to a line 9 extending to the distant point.

The use of three-phase power system at the control point is merely a matter of convenience

2 in providing the input for device 3 from which an output of variable phase and/or frequency may be derived.

At the other terminal of the improved system where the variable elements are to be controlled a feed transformer 10 has its primary 11 connected to control line 9. The input source 1 of the controlled point is connected to the primary windings of two transformers 12 and 13 the secondary windings of which couple balanced modulators in push-pull relation. A variable phase shifter network 14 is connected between the primary winding of transformer 13 and unit 1 to change the A.-C. voltage exciting the primary winding of transformer 13 in approximately 90° phase displaced relation with respect to the excitation of the primary winding of transformer 12. The secondaries of input transformers 12 and 13 are connected to the input grids of four three-element tubes 15, 16, 17 and 18 which are arranged to serve as balanced modulators.

One balanced modulator comprises tubes 15 and 16 having their control grids excited differentially (push-pull) by A.-C. in the secondary winding of transformer 12 and having their anodes coupled to winding 26 of a controlled motor. The other balanced modulator comprises the tubes 17 and 18 having their control grids excited in pushpull relation by A.-C. from the secondary winding of transformer 13 and having their anodes coupled to field winding 25 of the controlled motor. The pushpull excitation of the grids of tubes 17 and 18 is displaced about 90° with respect to the excitation of the grids of tubes 15 and 16 because of the action of phase shifter 14. The windings 25 and 26 are angularly disposed.

The secondary windings of transformers 12 and 13 both are connected at their midpoints to the secondary winding of the transformer 10 which is also connected to a bias source 19 connected by ground to the cathodes of all of the tubes to maintain the grids slightly above ground and cathode potential. The fundamental frequency of the power line inputs 1 and 2 is suppressed or filtered out by four low pass filters 21, 22, 23 and 24 so that only the difference frequency is supplied by the balanced modulators to windings 25 and 26 of a motor. The windings 25 and 26 have midpoint taps for supplying current from a D.-C. source 27 to the anodes of the balanced modulator tubes. A cathode heating current is arranged for the tubes 15, 16, 17 and 18 and is supplied from a D.-C. source 28. The motor may be made up with a toothed rotor 29 arranged in the field of windings 25 and 26 in such a manner that it will rotate at a speed corresponding to the difference between the frequencies supplied from source 1 and the land control line 9. A shaft 30 is secured to rotor 29 and arranged to be coupled to the variable device not shown which is to be controlled from the point 6.

An indicator 31 is employed to indicate the position of the variable device.

The purpose of having an indicator at the control point which is so arranged as to give the same reading as an indicator at the controlled point is, of course, to provide the operator at the control point a physical picture of what he is controlling.

In the operation of this system, if the rotor coil 5 of the device 3 is rotated mechanically by manual operation in one direction, there will appear in it a frequency which is higher than that of the power supply 2, and if the rotor coil 5 is rotated in the other direction, a frequency which is lower than that of the power line will result in secondary 5. When the secondary of device 3 is maintained at a constant mechanical position there is induced in it a voltage of constant phase relative to the phase of the voltage in the primary. When secondary 5 is rotated in one direction the phase of the voltage in it is advanced. If it is rotated fast enough to produce a phase advance of 360 degrees per second, it is equivalent to producing a new frequency one cycle per second greater than the frequency on the primary voltage. The same reasoning, of course, applies to rotation in the opposite direction and at other angular rates. The overall operation of the system is, in fact, such that the rotor 29 of motor 25 is locked in step with position of the rotor 5 of device 3.

The A.-C. power from source 1 is transmitted through the primaries of transformers 12 and 13 in push-pull relationship to the grids of the balanced modulators. The A.-C. voltage feeding the transformer 13 is changed in its angular phase position approximately 90 degrees by network 14.

The grids of both balanced modulators are also excited in parallel by A.-C. from line 9 through transformer 18.

When the rotor 5 is stationary and properly oriented in respect to its coupling to the three-phase windings at 4 currents of equal frequencies and phases (excepting as displaced as described above) are fed to the two balanced modulators and zero beat output is derived from the modulators. The windings 25 and 26 are then subject to steady or D.-C. currents and rotor 29 is stationary. The gearing between rotor 29 and indicator 31 and between rotor 5 and indicator 8 is arranged so that the angular position of indicator 31 is related as desired with respect to the angular position of indicator 8. Now if we rotate winding 5 in one direction the frequency of rotation thereof is added to the line frequency and the modulators now supply to the motor windings two phase beat notes of a frequency equal to the rate of rotation of rotor 5. The beat note currents through the windings 25 and 26 causes 29 to rotate just as winding 5 was rotated. Due to the step up in the gearing between rotor 5 and indicator 8, and between rotor 29 and indicator 31 the rotors may rotate a number of times for each rotation of the indicators.

Now if rotor 5 is rotated in the opposite direction there is a phase reversal of the beat notes (because when rotor 5 is rotated in one direction cycles are added to the line frequency while rotation of 5 in the opposite direction subtracts cycles from the line frequency) and the rotor 29 rotates in the opposite direction to follow the angular movement of rotor 5. The higher the beat note frequency the higher the rate of rotation of rotor 29.

The system responds to fractions of a cycle of rotation of rotor 5, i. e., phase changes in the manner as described above.

I have found that a motor which will operate in a satisfactory manner in this system is an iron cored motor known as the "Alnico type". The motor used here is of the hysteresis type wherein the rotor is of a magnetic material known widely in the electrical art under the registered trade name of Alnico. The motor used had two windings represented by numerals 25 and 26 and these windings of the motor were provided with midtaps for supplying the plate current to the balanced modulators. Satisfactory control of the motor is obtained.

As the power line frequency is suppressed in the windings of motor 25 by low pass filters 21, 22, 23 and 24 only the difference in frequency operates or actuates the motor 25. Therefore, as a result when the frequencies in the source 1 and line 9 are exactly equal, the rotor 29 of motor 25 will be stationary. When the rotor of device 3 is moved, the phase of the voltage transmitted over the transmission will be changed and the rotor 29 of motor 25 will then assume a new position. Thus it will be seen from this device that it is possible, by turning control 6, to cause a corresponding rotation of shaft 30. If desired, gears may be arranged so that indicator 31 will have the same reading as indicator 8.

Multiplication of the frequency transmitted on transmission line 9 may be desirable in some instances to produce a frequency more suitable for transmission over the particular transmission circuit at hand. Also it may in some cases be used as a means for stepping up the sensitivity of the control system since the angular displacement of a voltage is multiplied by the same factor as the factor by which its frequency is multiplied.

While I have indicated and described a system for carrying my invention into effect, it will be apparent to one skilled in the art that my invention is by no means limited to the particular organization shown and described, but that many modifications may be made without departing from the scope of my invention, as set forth in the appended claim.

What I claim is:

In apparatus for controlling the position of an element, a motor having a rotor linked by driving means with said element, said motor having windings angularly related, a source of alternating current, two converter stages, each having an output, leads connecting the output of one converter stage to one winding and the output of the other converter stage to the other winding, connections from said source to each converter for exciting the same by alternating current, a phase shifter in one of said connections, apparatus for supplying polyphase currents, of the same frequency as the currents of said source, to angularly related windings, a rotor winding in the field of said angularly related windings, connections from said rotor winding to each converter for exciting the same by alternating current of the same frequency as the alternating currents of said source when said rotor winding is stationary, the arrangement being such that the converters then supply zero beat notes to said motor windings, means for rotating the rotor winding in the desired direction at the desired rate, whereby said converters supply beat notes to said motor windings the phase of which denotes the direction of rotation of the rotor winding and the frequency of which depends on the rate of rotation of the rotor winding, and an indicator the position of which is fixedly related to the position of said rotor winding.

HAROLD O. PETERSON.

REFERENCES CITED

The following references are of record in the file of this patent:

UNITED STATES PATENTS

| Number | Name | Date |
| --- | --- | --- |
| 1,500,860 | Yo | July 8, 1924 |
| 1,762,725 | Marrison | June 10, 1930 |
| 1,934,400 | Bollman | Nov. 7, 1933 |